United States Patent
Morley et al.

(10) Patent No.: US 6,286,105 B1
(45) Date of Patent: Sep. 4, 2001

(54) METHOD FOR IMPLEMENTING LINK-LEVEL SECURITY TO ENFORCE ACCESS PRIVILEGES

(75) Inventors: Kenneth S. Morley, Draper; Brady V. Brown, Centerville; Ammon E. Gustafson, West Jordan, all of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/053,416

(22) Filed: Apr. 1, 1998

(51) Int. Cl.[7] ............................. G06F 11/30; G06F 12/14
(52) U.S. Cl. ........................ 713/202; 713/155; 713/168; 375/222; 375/223
(58) Field of Search ........................... 713/202, 200, 713/201, 155, 168; 710/240; 375/222, 223; 379/93.22

(56) References Cited

U.S. PATENT DOCUMENTS

| | | | |
|---|---|---|---|
| 4,484,306 | 11/1984 | Kulczykyj et al. | 364/900 |
| 4,779,224 | 10/1988 | Moseley et al. | 364/900 |
| 5,146,472 * | 9/1992 | Hallman | 375/8 |
| 5,261,070 | 11/1993 | Ohta | 395/425 |
| 5,287,519 | 2/1994 | Dayan et al. | 395/700 |
| 5,323,146 | 6/1994 | Glaschick | 340/825.34 |
| 5,481,720 | 1/1996 | Loucks et al. | 395/700 |
| 5,499,372 * | 3/1996 | Mackenzie et al. | 395/725 |
| 5,546,463 | 8/1996 | Caputo et al. | 380/25 |
| 5,623,637 | 4/1997 | Jones et al. | 395/491 |
| 5,636,282 * | 6/1997 | Holmquist | 380/25 |
| 5,751,796 * | 5/1998 | Scott et al. | 379/93.31 |
| 5,796,808 * | 7/1998 | Scott et al. | 379/93.31 |
| 5,852,631 * | 12/1998 | Scott | 375/222 |
| 5,949,819 * | 9/1999 | Bjarnason et al. | 375/222 |
| 5,974,043 * | 10/1999 | Solomon | 370/352 |

* cited by examiner

Primary Examiner—Ayaz Sheikh
Assistant Examiner—Firmin Backer
(74) Attorney, Agent, or Firm—Workman, Nydegger & Seeley (57) ABSTRACT

A method and architecture for implementing link level security to enforce access privileges between a calling modem and an answering modem over a communication channel during a communication session in a modem employing a communication protocol capable of modulation modification. Security scramblers different from the standard scrambler inherent in the communication protocol are loaded into a calling modem and an answering modem. A password may alternatively be entered into the calling modem for verification prior to the enablement of the security process. During the training phase of the communication protocol, descriptors designating specific secure scramblers are passed from the calling modem to the answering modem for verification of the correct access privileges by the calling modem. The answering modem thereafter directs the calling modem to utilize yet another secure scrambler for the subsequent training and exchange of data. Since the secure scrambler modifies the modulation of each modem, incompatible scramblers are unable to properly train and therefore unable to establish a communication channel therebetween. An alternative implementation also employs scrambler hopping to provide yet further security.

16 Claims, 5 Drawing Sheets

METHOD FOR IMPLEMENTING LINK-LEVEL SECURITY TO ENFORCE ACCESS PRIVILEGES

BACKGROUND OF THE INVENTION

1. The Field of the Invention

This invention relates to access control between two or more network elements. More particularly, this invention relates to enforcing access privileges between interacting modems employing a defined protocol standard.

2. Present State of the Art

Traditional security and communication systems have employed a full spectrum of techniques from very simplistic techniques to extremely sophisticated and secure cryptographic methods. Many applications require stringent security measures for the protection of information traveling across the communication channel.

However, other communication channels may rely upon more simplistic techniques for preventing or at least greatly inhibiting unauthorized access to information on either end of a communication channel.

Traditional information security has generally been provided through the use of authentication and cryptographic information at a high level in a protocol communication stack. For example, authentication and access control are generally controlled at an application level where a communication channel has been established and the respective entities of the communication channel are interacting using an established communication protocol. Modern sophisticated communication protocols often utilize an extensive interactive process for establishing and refining a communication channel to enhance the data rate between the respective entities, namely modems. Access control is thereafter established at a higher protocol level. In thus allowing the respective entities of a communication channel to establish a link between the two entities for the purpose of verifying and authenticating the respective entities, the communication channel entities have in an unlimited respect opened themselves and made access available to the unauthenticated party. Furthermore, such an access evaluation process is generally performed, as discussed above, at a higher application level requiring a significant amount of processing and preparatory work to be performed by the various communication channel entities.

Thus, what is needed is a method of implementing security to enforce access privileges between communication channel entities, such as a calling modem, and an answering modem at a lower level in a protocol communication stack that does not introduce a substantial exposure to the entities by establishing higher level communication channels prior to enforcing, or alternatively restricting, the access of one entity to the other. Thus, it appears that there exists no present technique for providing a low level method of implementing security, such as link level security, to enforce access privileges between a calling modem and an answering modem over a communication channel. Therefore, a need exists for providing such a method wherein access control may be performed at a lower and more introductory phase of the establishment of a communication channel.

SUMMARY AND OBJECTS OF THE INVENTION

It is an object of the present invention to provide a method of implementing link level security to enforce access privileges between a calling modem and an answering modem over a communication channel during a communication session.

Another object of the present invention is to provide a method and architecture for enabling a security administrator to preload access control information into an initiating entity such as a calling modem hereby enforcing access privileges without requiring the exchange of the actual values enforcing the access control over the communication channel during a link establishment process.

A still further object of the present invention is to provide a method for enforcing access privileges between the entities of a communication channel such as a calling modem and an answering modem by preventing the two from physically exchanging discernable data information when the access privileges are not compatible.

Yet another object of the present invention is to provide a method of physically inhibiting the discernability of data information between entities lacking compatible access privileges.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the foregoing objects, and in accordance with the invention as embodied and broadly described herein, a method for implementing link level security to enforce access privileges between a calling modem and an answering modem over a communication channel during a communication session is provided. The purpose of the present invention is to enforce access privileges at a lower level in a communication protocol stack, such as at a link level, thereby foregoing the establishment of a communication channel between entities when the access privileges associated therebetween are incompatible.

The present invention provides for a feature within a communicating device, such as a modem, that provides some security in a link level environment which may, alternatively, be activated through the use of a password known to the user and stored within the calling modem. The present invention is implemented, in one embodiment, by the installation of a password that is encoded and saved within the calling modem, the installation of which may be performed by a system administrator. When a calling modem attempts to contact an answering modem to establish a communication channel to facilitate a communication session through which data may be exchanged, the modems begin to establish a communication channel through traditional like-protocol mechanisms. In the preferred embodiment, a V.34 protocol invokes various phases during the generation and establishment of a communication channel. In the preferred embodiment, the calling modem queries a user for the necessary password for implementing an access controlled communication channel. The calling modem receives from the user a password and verifies the correctness of the password and thereafter engages security substeps in the establishment of the communication channel.

The V.34 communication protocol commences with a negotiating phase to determine and establish the optimized conditions for the physical layer between the calling and answering modems. The negotiating and handshaking process in the preferred embodiment takes the form of a phase 2 INFO sequences. Alternatively, V.8 handshaking sequences may be used. In the phase 2 handshaking start up procedure, the calling modem selects a subset of descriptors identifying individual modulation modifying polynomials, also known as scramblers, utilized by the V.34 protocol. The set of descriptors as well as the individual polynomials describing the scramblers are initially loaded into the calling modem by a security administrator thereby configuring the calling modem. Those skilled in the art of communication protocols, such as V.34, appreciate that the V.34 specification employs a standard polynomial for the generation of a standard scrambler for use during a non-secure communication session. In the present invention, non-standard polynomials and non-standard scramblers are derived and implemented for compatible communication between the calling modem and the answering modem during an access controlled communication session.

Upon the receipt of the descriptors for the corresponding scramblers as selected by the calling modem, the answering modem verifies that the descriptors comprise a subset of the security scramblers assigned to the calling modem. Upon the completion of the verification of the descriptors as sent by the calling modem, the answering modem requests another specific descriptor describing a secure scrambler, and requests the calling modem utilize this descriptor in selecting a specific security scrambler for use in the remainder of the training process. Upon the receipt of the request for the descriptor designating the secure scrambler to be used, the calling modem responds with the said descriptor, and continues the training process utilizing the secure scrambler in place of the standard scrambler for the remainder of the V.34 training process. Upon receipt of the descriptor designating the secure scrambler to be used, the answering modem verifies that the descriptor is the one it requested, and then continues the training process utilizing the secure scrambler in place of the standard scrambler for the remainder of the V.34 training process.

In the present invention, if both the calling modem and the answering modem do not contain the respective modulation-modifying secure scrambler definitions, the training process at the link level fails because the calling modem dispatches data whose modulation is modified in one respect to which the answering modem is demodulating the received data in yet another respect. Due to the inordinate number of data errors present for such a misdemodulation, the training process fails at the link layer and does not enable the calling and answering modems to progress to a higher level within the protocol stack.

Therefore, the security mechanism of the present invention becomes more reliable than standard password schemes for various reasons. First, since the connection is maintained for a very short period of time, on the order of seconds, there is very little time for analysis to be performed by a spoofer monitoring the communication channel. Also, the security mode signaling is performed during the normal handshaking times of the V.34 phase 2 negotiation. The analysis of the communication channel by a spoofer during such a period of time does not immediately divulge the fact that non-standard negotiation processes are being performed. Furthermore, modems that were not originally configured with the secure scramblers are unable to negotiate and establish a communication channel.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope a method for implementing link level security to enforce access privileges between a calling modem and an answering modem over a communication channel during a communication session. The present invention also provides a method for restricting access between a calling modem and an answering modem at a level much lower in a protocol stack than traditional access control and cryptographic techniques. The present invention provides a method for enforcing access control at a lower level, such as a link layer level, occurring prior to the establishment of a communication channel and the interaction between entities at higher or application layers.

Figure 1:
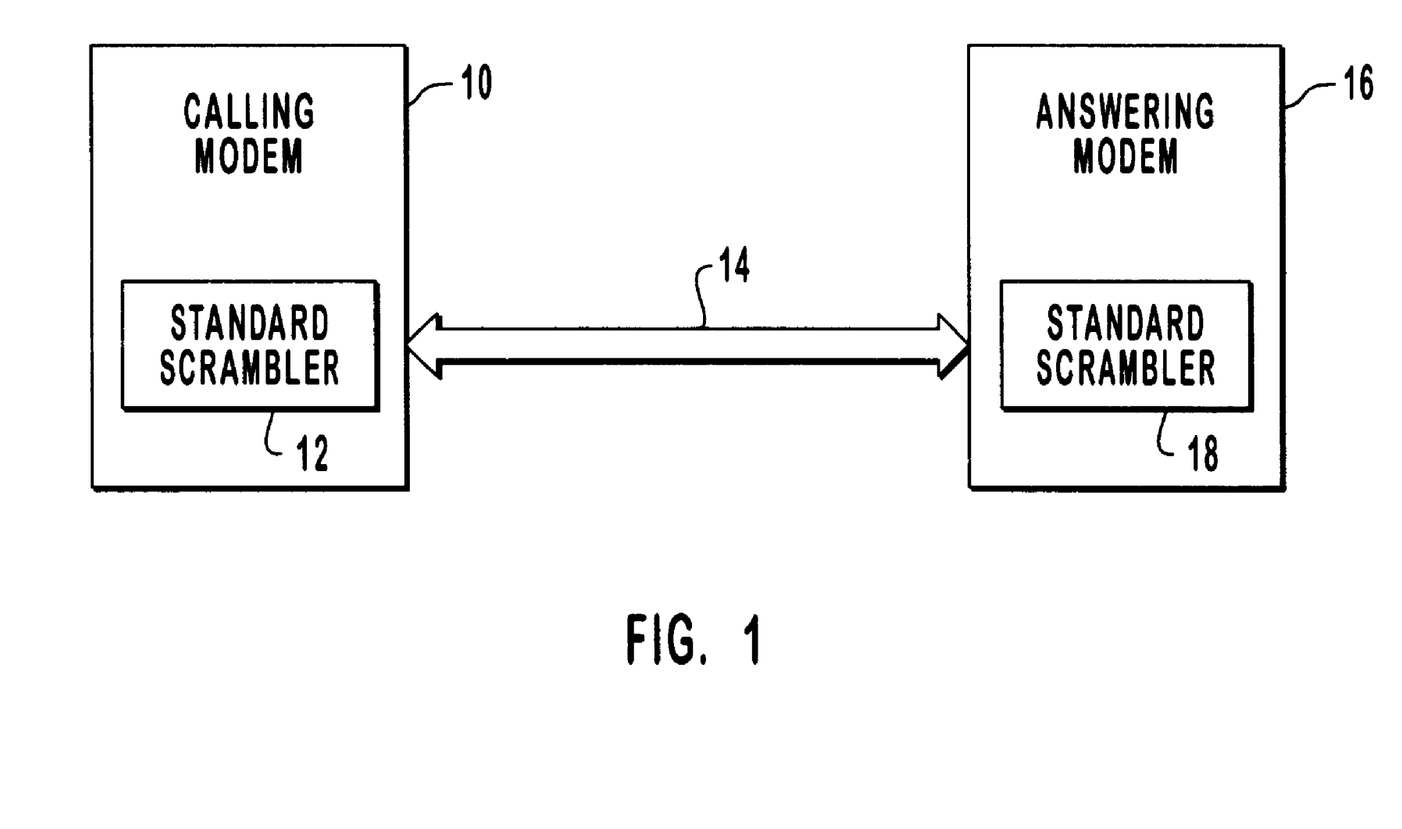
FIG. 1 is a simplified block diagram illustrating the standard scramblers employed by the standard implementation of the V.34 protocol.

FIG. 1 depicts an interactive environment wherein modems employ communication protocols capable of modulation modification for use in a communication channel. A calling modem 10, such as a traditional personal computer modem, may employ modern protocol standards that utilize sophisticated channel evaluation and negotiating techniques. In the preferred embodiment of the present invention, a calling modem 10 employs a V.34 communication protocol for the establishment of a communication channel 14 between an answering modem 16 and the calling modem 10. The V.34 communication protocol was originally developed to implement a two-wire dial modem standard capable of operating at higher speeds around 28.8 KBPS. One of the most substantial technical advancements in the V.34 technology is the standard's ability to adapt to the physical parameters of the communication channel between calling modem 10 and answering modem 16. The V.34 protocol is implemented by a series of phases which perform specific functions in the establishment of a high speed communication channel.

Furthermore, higher speed communication channels attempt to more evenly distribute the transitions in the data by employing scrambling techniques. The V.34 standard employs scrambling techniques to induce a more uniform distribution of data, or more accurately symbol distribution, for any given data transmission. In order to provide a more evenly distributed data distribution, the V.34 standard employs a scrambler to induce variation on the transmitted data. Furthermore, the V.34 standard utilizes a fixed and well-defined polynomial for implementing the standard scrambler.

FIG. 1 depicts both calling modem 10 and answering modem 16 as each containing a standard scrambler 12 and standard scrambler 18, respectively. Those skilled in the art of V.34 protocol, appreciate that the call mode generating polynomial and the answer mode polynomial are different. Those skilled in the art of V.34 protocol also appreciate that the call mode generating polynomial and the answer mode polynomial are different, however, both assume a fixed polynomial as defined in the V.34 specification.

Figure 2:
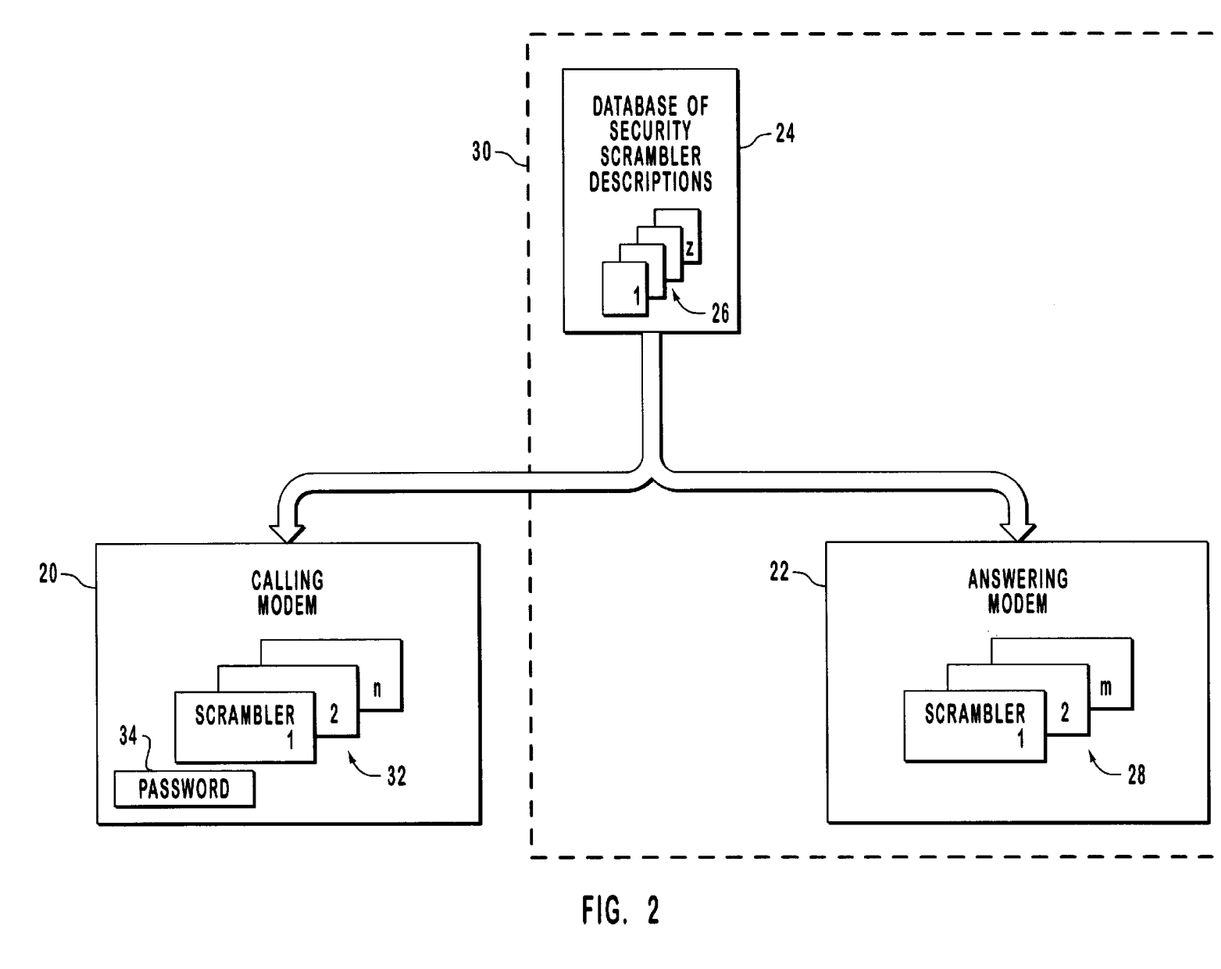
FIG. 2 is a simplified block diagram of the configuration phase for configuring a calling modem and an answering modem to implement link-level security to enforce access privileges over a communication channel, in accordance with a preferred embodiment of the present invention.

FIG. 2 depicts a simplified block diagram of the distribution of security scramblers, in accordance with a preferred embodiment of the present invention. In the present invention, the modulation modification is changed through the selection of self-synchronous scramblers used for randomizing the data before modulation. In the preferred embodiment, the V.34 standard specifies a three-tap scrambler, $1+X^5+X^{23}$ and $1+X^{18}+X^{23}$, for the originating or calling mode and answering mode, respectively. In such an embodiment, the scrambler maintains a maximum length such that a bit sequence will repeat after approximately 8 Mbits for constant input. In the present invention, the security scramblers that are employed maintain sequence lengths above approximately 100 Kbits, 500 Kbits or 1 Mbits, depending on the quantity of scramblers in the pool of security scramblers. For example, there exists approximately 8,000 scramblers with at least 1 Mbit sequence length that may involve 3, 4 or 5 taps, and may have maximum delays between 20 and 31. The security scramblers employed are preferably determined empirically and are listed in a database 24 as security scramblers 26.

In the preferred embodiment, a calling modem 20 may receive from the pool of security scramblers 26 a table comprised of a few of security scramblers 26 depicted in FIG. 2 as security scramblers 32. In the preferred embodiment, calling modem 20 receives a grouping or table of 16 security scramblers 32 for storage preferably in non-volatile memory. Alternatively, calling modem 20 may be further comprised of the V.34 standard scrambler for use in a non-access control mode. In the present invention, the selected security scramblers may alternatively be selected via AT commands or, as in the preferred embodiment, a password 34 may be loaded within calling modem 20 by an entity, such as a security administrator, during the loading of security scramblers 32 which may yet in turn be activated when a user inputs the password into calling modem 20 and the entered password is thereafter verified when compared with password 34. The proper comparison of the passwords thereafter enables the use of the security features of the present invention.

FIG. 2 further depicts an answering modem 22 having distributed therein a pool or collection of security scramblers 28 capable of compatible yet secure communication with calling modem 20. FIG. 2 further depicts a grouping 30 wherein database 24 may be included within answering modem 20 such as in an implementation wherein answering modem 22 takes the form of a network server through which remote entities such as calling modem 20 interact to obtain access to system information such as in the case of a network or server environment. In such an integrated environment, answering modem 22 may contain a superset of security scramblers thereby facilitating access control to multiple calling modems.

Figure 3:
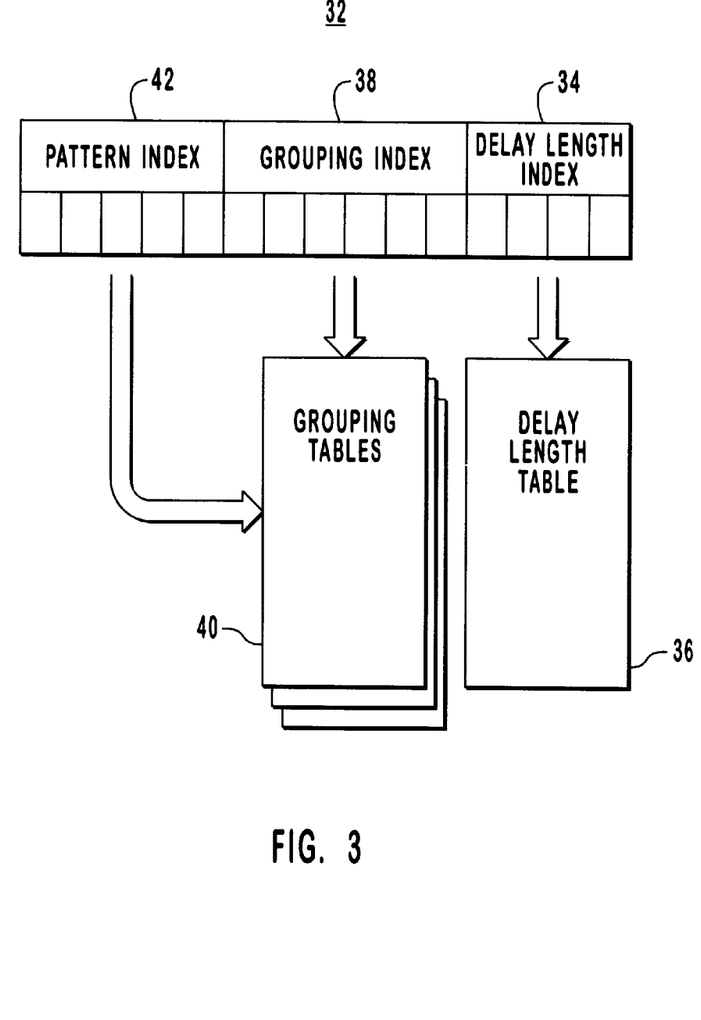
FIG. 3 is a simplified diagram of the secure scrambler descriptions, in accordance with a preferred embodiment of the present invention.

FIG. 3 depicts the scrambler descriptions for use in the present invention, in accordance with a preferred embodiment. A scrambler description 32 is divided into three fields. The four least significant bits of scrambler description 32 form an index 34 into a table of delay lengths 36. In the preferred embodiment, the delay lengths range between 16 and 31, with the descriptor for the standard, with the non-security scrambler/descrambler, reserved as index zero corresponding to a delay length of 23. In the preferred embodiment, a delay length of 23 is also given another location in the table to include all entries of delay length equaling 23 and therefore the corresponding scramblers need not be associated with a fixed index.

The next six least significant bits of scrambler description 32 form a grouping index 38. In the preferred embodiment, since the selection of taps utilizes a number of taps between three and five taps two of which are at both ends of the delay line, there remains between one and three taps located in the middle of the delay line. For efficiency reasons, the preferred embodiment restricts the locations where the middle taps may be located to be no closer than four positions to either end of the delay line, and even enhances the restriction of the distance from the ends of the delay line to larger values for larger length security scramblers due to implementation constraints such as those relating to processor execution requirements. Such requirements upon the location of the taps results in approximately 21 viable tap locations which, in the preferred embodiment, are grouped into triplets (e.g., 4-5-6, 7-8-9, . . . , 22-23-24). In the present embodiment, each triplet is represented by a 1 if there is at least one tap used for the security scrambler, or a 0 if none of the taps are used for the security scrambler. Since there are only one to three ones in the seven bit representation, there are only 63 valid representations. Therefore, these representations are put in a table 40 which is indexed by grouping index 38.

The subsequent 5 bits of scrambler description 32 form a pattern index 42. Since groupings may have either 1, 2 or 3 ones in their representation, and are therefore called Group 1, Group 2 or Group 3, respectively, the patterns that each triplet may assume are affected by the number of ones. For example, a Group 3 may be comprised only of triplets with a single tap from each triplet, but a Group 1 may have a triplet with 1 to 3 taps. Thus, there exists three tables which may be indexed based on the group number. If each tap in a triplet is represented by a 1 or a 0, the bits will form a pattern. Group 1 will have one triplet pattern, Group 2 will have two triplet patterns and Group 3 will have three triplet patterns, and although the triplet patterns are sparse for Groups 2 and 3, there exists 9 valid patterns for Group 3 and 27 valid patterns for Group 2 with 7 valid patterns for Group 1. Therefore, the various patterns may be indexed by a five bit number, pattern index 42. Also, since delay length index 34, grouping index 38 and pattern index 42 are all indexes to tables, the tables may be rearranged in the event the tables have been compromised without requiring the full extensive loading of the tables.

Figure 4:
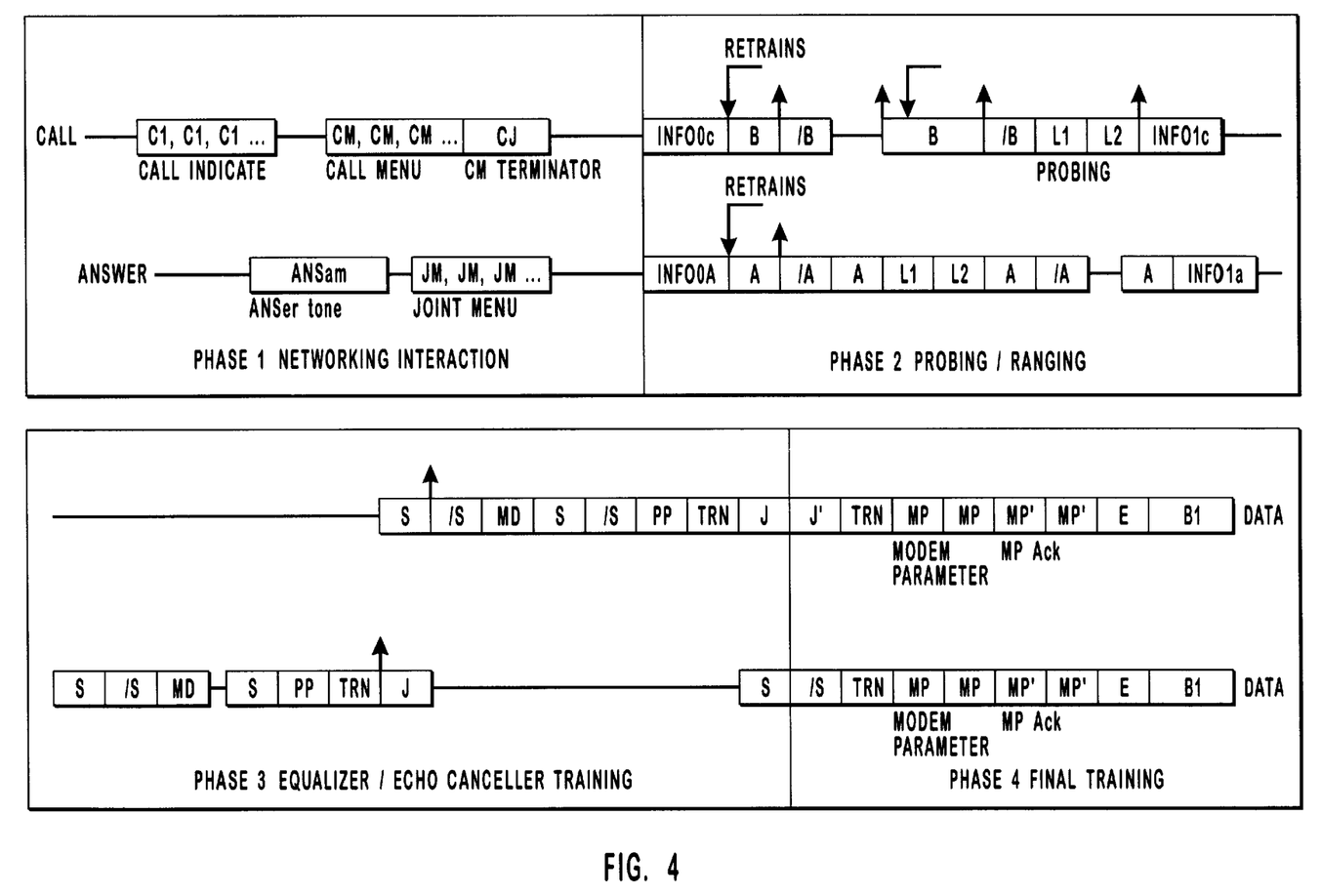
FIG. 4 is a flow diagram of the interaction between a calling and answering modem during the V.8 negotiation phase of establishing a communication channel, in accordance with the preferred embodiment of the present invention.

FIG. 4 depicts the V.34 phase 2 training phase performed as a portion of the V.34 protocol, in accordance with a preferred embodiment of the present invention. While the present invention may be carried out in other protocols, the preferred embodiment employs V.34 which further utilizes the phase 2 training phase. Those skilled in the art of V.34 protocols, appreciate that the point where random selection of table entries occurs is during phase 2 of the V.34 training. In this phase, INFO sequences are normally exchanged detailing some of the modem's capabilities. In the present invention, additional INFO sequences have been added before each regular INFO sequence which contains the Caller Identification packets (with the new INFO sequences denoted as INFO' sequences). In the preferred embodiment of the present invention, the calling modem's first sequence (INFOOc') contains 20 bits from a random number generator. The first four bits are used for table entry selection, while the other 16 bits are used for encoding. Four entries are then taken from the table starting with the selected entry and, thereafter, taking each successive entry while wrapping around to the beginning of the table, if necessary. The four entries are then put through a $1+X^{16}+X^{32}$ scrambler having delay lines that are initialized with 5D91h and with the said 16 bit encoding number.

Conversely, the answering modem's first sequence (INFOOa') also contains 20 bits from a random number generator with the same purpose as those used in INFOOc', however, they are intended for the calling modem's second INFO' sequence (INFOIc'), and the answering modem does not follow the 20 bit sequence with any of its table entries. The calling modem uses the selection bits and scrambler seed to select and scramble the selected entry and sends only the scrambled data in its second INFO' packet (INFOIc'). The answering modem compares all of the entries it has received to its table and, if correct, allows training to continue. In any case, it will send back an INFOla' packet containing a 15 bit count offset (from 32768) obtained from a random number generator (not shown). Such a count offset may be employed in an alternate embodiment of the present invention wherein scrambler hopping is employed.

In the preferred embodiment of the present invention, if there is a mismatch between a modem employing a secure scrambler and a modem employing a standard scrambler attempting to talk with each other, the secure modem will force both modems to remain in phase 2 of the training process since the secure modem is constantly looking for the INFO' sequences, which it will never receive. Therefore, after the given timeout period, typically about one minute, both modems will give up and terminate the connection. Similarly, if there are any bit errors in the INFO sequences, a cyclical redundancy code (CRC) will catch the errors thereby initiating traditional V.34 recovery procedures with the INFO' sequence preceding the INFO sequence.

In the preferred embodiment, it is necessary to obtain the scrambler selection before commencement of phase 3 of V.34 training. In phase 3, the scrambler is used for training of the echo canceler and equalizer. If the scrambler selection is not correct, the equalizer is unable to train to the incoming signal and will cause a repeated retrain in an attempt to synchronize. If the answering modem determines that the entries it received are incorrect, it will set a bit to lockout the calling modem. The answering modem may either then hang up immediately or it may act like it is continuing with training and cause a retrain after a brief period of time, such as approximately 2 seconds. The lockout bit will remain set for the duration of the call such that when phase 2 training is repeated, even valid sequences will not be honored. Such a process assumes that the INFO' sequence CRC guarantees the first INFO' sequences are error free so subsequent phase 2 training does not allow additional attempts to determine the valid access code.

Figure 5:
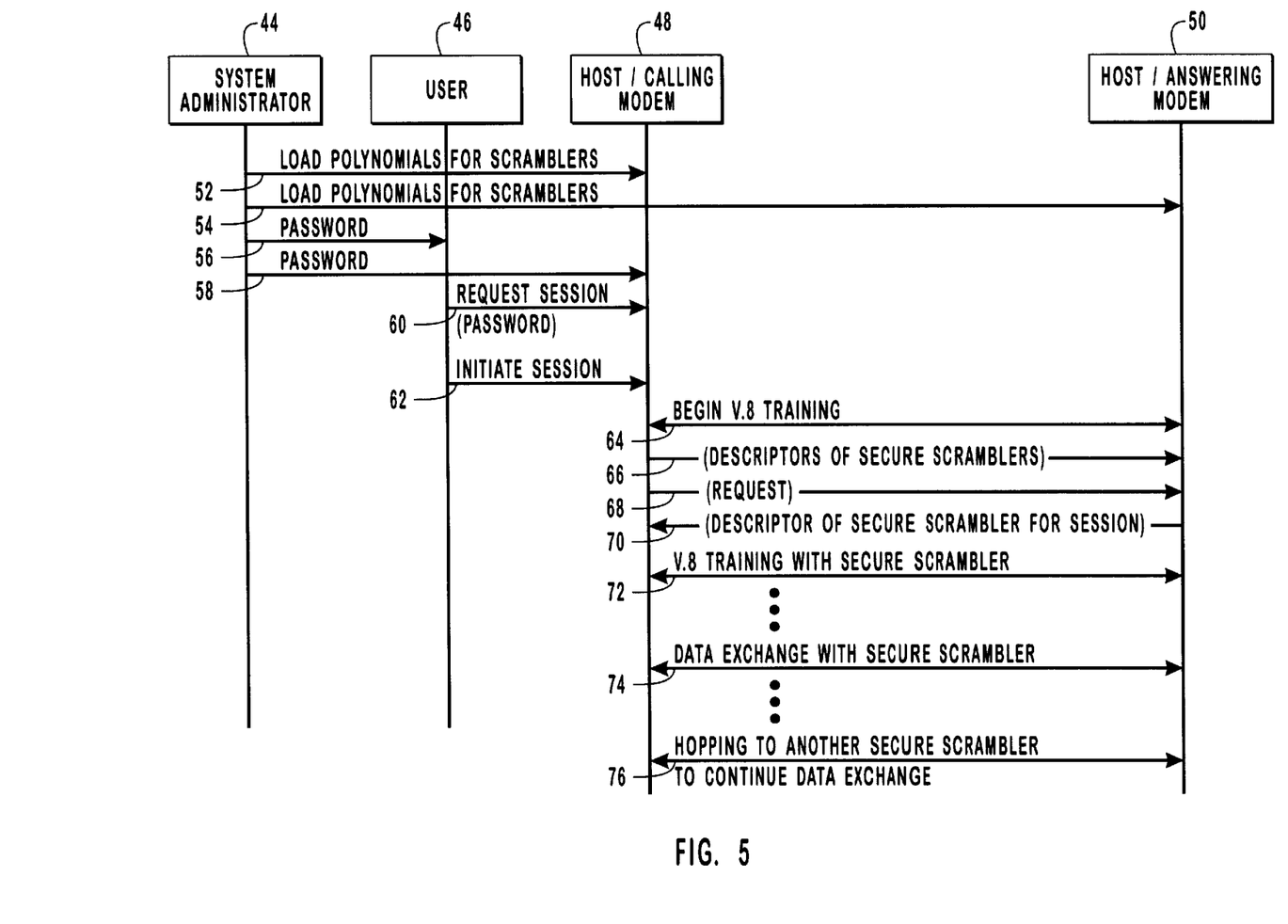
FIG. 5 is a flow chart of the access privilege verification process, in accordance with the preferred embodiment of the present invention.

FIG. 5 is a flow diagram for implementing link level security to enforce access privileges between a calling modem and an answering modem over a communication channel during a communication session, in accordance with the preferred embodiment of the present invention. In the present invention, a system administrator 44, or other access control entity in a step 52 loads polynomials which describe the security scramblers and associated descriptors into a calling modem 48. The generation and partitioning of the security scramblers was described in FIG. 2 and generally comprises a subset of security scramblers that differs from the standard scrambler associated with the V.34 protocol standard.

A step 54 is separately employed to load the corresponding security scramblers into an answering modem 50 for compatible interaction with calling modem 48. As described in FIG. 2, answering modem 50 may either be comprised of a set of scramblers compatible with calling modem 48 or may contain a superset of scramblers or even the entire pool of scramblers for the present invention.

In the preferred embodiment of the present invention, when a user 46 obtains a new modem such as calling modem 48, all security mechanisms are blank and the modem defaults to a standard modem operation unless other steps are taken. In the present invention, calling modem 48 would be given to a security administrator who would down load the modulation modification parameters, the security scrambler, for the particular access privileges granted to user 46. Furthermore, the security administrator or other individual programming calling modem 48 may down load a password to calling modem 48 for storage therein as depicted in a step 58. Likewise, system administrator 44 must also divulge to user 46 the password in step 56 for use in activating the secure access capabilities of the present invention.

In a step 60, user 46 requests a session through interaction with calling modem 48 and passes the received password within the request. Subsequently, user 46 in a step 62 initiates a session request to calling modem 48 which upon the successful password comparison in step 60, activates the secure scramblers for use during subsequent processing.

In a step 64, calling modem 48 begins the V.34 training session with answering modem 50. Those skilled in the art of V.34 processing appreciate the specifics involved in the V.34 training process. When calling modem 48 continues the training process, calling modem 48 selects at random four entries from the modulation modification table also known as the security scramblers illustrated in FIG. 2, and encodes the descriptors and presents them to answering modem 50 in a step 66. Furthermore, calling modem 48 issues a request in step 68 to answering modem 50. In response to the request, answering modem 50 asks calling modem 48 in step 70 to encode and present a specific descriptor from the calling modem's table of security scramblers. If the descriptors sent by calling modem 48 to answering modem 50 in step 66 match the descriptors for the secure scramblers known or stored within answering modem 50, and if calling modem 48 presents the correct requested entry, then answering modem 50 will engage the selected modulation modification and continue with the training process in step 72.

Calling modem 48 continues the training process regardless of any mismatches in the descriptor values. If the entries or descriptor values as presented to answering modem 50 and compared therein do not match, answering modem 50 may either hold calling modem 48 on the line and evade the establishment of an access-verified communication channel by constantly retraining but never completing the retraining process, or answering modem 50 may hang up after a short time out to free itself for access by other valid users. In either case, answering modem 50 will not properly react until both conditions are met.

In the preferred embodiment wherein calling modem 48 presents four entries, the four entries of calling modem 48 are each 16 bits in length, and in addition, there are an additional 20 bits of encoding and selection information. The probability of circumventing the security of the present invention by determining the four entries has a probability of about 1 in $2^{64}$. Also, the requested entry by answering modem 50 carries an additional 1 in $2^{16}$ chance for chance circumvention. It should be explicitly pointed out that in the present invention, answering modem 50 never reveals during the process which entries it has in its tables.

After the calling mode-invoked packets are processed and found correct, the selected modulation modifier entry is taken from the table and decoded to adjust the modem's modulation parameters. By modifying the modem's modulation parameters, even if an assailant is able to come up with the proper sequence of bits for spoofing the caller identification, the spoofer still cannot establish a connection unless its modem is capable of sending and receiving with the chosen modulation modification parameters. In the preferred embodiment, there are greater than 8,000 ways the modem output may be modified and even though the table entries are 16 bits in length, so there are a number of faulty descriptions which the modem will allow, but will not provide any useful modulation modification. Therefore, if a spoofer's modem is not configured correctly, answering modem 50 will continue to retrain over and over until it times out. It is conceivably the modem's securest line of defense in that it requires the user to have properly configured hardware. In addition, the number of people who have the knowledge or means to build a similar modem and attempt to discover the modification mechanism of the present invention appears very limited. Once the secure scrambler is installed, a step 74 utilizes the secured scrambler for the exchange of data.

In an alternate embodiment of the present invention, a step 76 employs a scrambler hopping technique. As training enters phase 4, calling modem 48 and answering modem 50 become synchronized again. At such a point, a down counter which answering modem 50 has initialized upon the initialization of both modems begins counting down. For each symbol scrambled or descrambled, the down counters are decremented. When the down counters reach a count of zero, the counters are reset and the scrambler/descrambler pointer is incremented modulus 16 to the next secure scrambler in the table. The next call to the scrambler/descrambler will then notice the description has changed and will load the new secure scrambler/descrambler. In this embodiment, scramblers/descramblers can be changed without retraining or other throughput overhead processes.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a modem employing a communication protocol capable of modulation modification utilizing a standard scrambler, a method of implementing link level security to enforce access privileges between a calling modem and an answering modem over a communication channel during a communication session, comprising the steps of:
    a) exchanging at least one security scrambler descriptor from said calling modem to said answering modem, said descriptor uniquely identifying a security scrambler known to both said calling modem and said answering modem, said security scrambler differing from said standard scrambler;
    b) verifying at said answering modem that said security scrambler designated by said at least one security scrambler descriptor from said calling modem was previously assigned to said calling modem;
    c) training with said security scrambler said communication channel between said calling modem and said answering modem to optimize transmission parameters therebetween; and
    d) modifying said modulation of data using said security scrambler between said calling modem and said answering modem during a data transmission phase of said communication session, said modifying said modulation of data using said security scrambler step further comprises the step of hopping from said security scrambler to a second security scrambler also common to both said calling modem and said answering modem upon the occurrence of a predetermined condition.

2. The method of implementing link level security to enforce access privileges between a calling modem and an answering modem over a communication channel during a communication session, as recited in claim 1, further comprising the step of installing in said calling modem, prior to said exchanging step, at least one security scrambler from a superset of security scramblers differing from said standard scrambler.

3. The method of implementing link level security to enforce access privileges between a calling modem and an answering modem over a communication channel during a communication session, as recited in claim 2, further comprising the steps of:
    a) installing in said calling modem, prior to said exchanging step, a password to authenticate a user of a calling computer at said calling computer, said calling computer being operatively coupled to said calling modem; and
    b) when said user is authenticated, enabling said link level security for use during said communication session.

4. The method of implementing link level security to enforce access privileges between a calling modem and an answering modem over a communication channel during a communication session, as recited in claim 3, further comprising the step of when said user incorrectly enters said password a predetermined number of times, locking out said user from employing said communication protocol via said calling modem.

5. The method of implementing link level security to enforce access privileges between a calling modem and an answering modem over a communication channel during a communication session, as recited in claim 2, wherein:
    a) said installing step comprises the step of installing a plurality of said descriptors uniquely identifying a plurality of security scramblers; and b) said exchanging step comprises the steps of selecting a subset of said descriptors of said plurality of security scramblers and exchanging said subset of descriptors from said calling modem to said answering modem.

6. The method of implementing link level security to enforce access privileges between a calling modem and an answering modem over a communication channel during a communication session, as recited in claim 5, wherein said verifying step further comprises the steps of:

a) following said verifying step, said answering modem requesting from said calling modem a specific one of said at least one descriptors corresponding to one of said descriptors designating said security scrambler; and b) said answering modem verifying said calling modem selected said specific one of said at least one descriptors.

7. The method of implementing link level security to enforce access privileges between a calling modem and an answering modem over a communication channel during a communication session, as recited in claim 1, further comprising the step of employing a V.34 standard as said communication protocol.

8. The method of implementing link level security to enforce access privileges between a calling modem and an answering modem over a communication channel during a communication session, as recited in claim 1, wherein said training step further comprises the step of employing a V.34 phase 2 training sequence or V.8 handshaking sequence standard during said training step.

9. A computer-readable medium for implementing link level security to enforce access privileges between a calling modem and an answering modem over a communication channel during a communication session, said computer-readable medium having computer executable instructions for performing the steps of:

a) exchanging at least one security scrambler descriptor from said calling modem to said answering modem, said descriptor uniquely identifying a security scrambler known to both said calling modem and said answering modem, said security scrambler differing from said standard scrambler;

b) verifying at said answering modem that said security scrambler designated by said at least one security scrambler descriptor from said calling modem was previously assigned to said calling modem;

c) training with said security scrambler said communication channel between said calling modem and said answering modem to optimize transmission parameters therebetween; and d) modifying said modulation of data using said security scrambler between said calling modem and said answering modem during a data transmission phase of said communication session, the step of modifying said modulation of data using said security scrambler further comprises computer executable instructions for performing the step of hopping from said security scrambler to a second security scrambler also common to both said calling modem and said answering modem upon the occurrence of a predetermined condition.

10. The computer-readable medium as recited in claim 9, having further computer executable instructions for performing the step of installing in said calling modem, prior to said exchanging step, at least one security scrambler from a superset of security scramblers differing from said standard scrambler.

11. The computer-readable medium as recited in claim 10, having further computer executable instruction for performing the steps of:

a) installing in said calling modem, prior to said exchanging step, a password to authenticate a user of a calling computer at said calling computer, said calling computer being operatively coupled to said calling modem; and b) when said user is authenticated, enabling said link level security for use during said communication session.

12. The computer-readable medium as recited in claim 11, having further computer executable instruction for performing the step of when said user incorrectly enters said password a predetermined number of times, locking out said user from employing said communication protocol via said calling modem.

13. The computer-readable medium as recited in claim 10, wherein said computer executable instructions for performing said installing step comprises computer executable instructions for performing the step of installing a plurality of said descriptors uniquely identifying a plurality of security scramblers and said computer executable instructions for performing said exchanging step comprises computer executable instructions for performing the steps of selecting a subset of said descriptors of said plurality of security scramblers and exchanging said subset of descriptors from said calling modem to said answering modem.

14. The computer-readable medium as recited in claim 13, wherein said computer executable instructions for performing said verifying step further comprises computer executable instructions for performing the steps of:

a) following said verifying step, said answering modem requesting from said calling modem a specific one of said at least one descriptors corresponding to one of said descriptors designating said security scrambler; and b) said answering modem verifying said calling modem selected said specific one of said at least one descriptors.

15. The computer-readable medium as recited in claim 9, having further computer executable instructions for performing the step of employing a V.34 standard as said communication protocol.

16. The computer-readable medium as recited in claim 9, wherein said computer executable instructions for performing said training step further comprises computer executable instructions for performing the step of employing a V.34 phase 2 training sequence or V.8 handshaking sequence standard during said training step.

* * * * *